United States Patent Office 2,947,745
Patented Aug. 2, 1960

2,947,745
SUBSTITUTED PHENOXAZINE SEDATIVE AGENTS

Paul N. Craig, Roslyn, Pa., assignor to Smith Kline & French Laboratories, Philadelphia, Pa., a corporation of Pennsylvania No Drawing. Filed Aug. 11, 1958, Ser. No. 754,131

14 Claims. (Cl. 260—244)

This invention relates to a series of new 10-(dialkyl-aminoalkyl)-phenoxazine derivatives having utility as sedative agents. This invention also relates to the process for preparing these compounds and to the new 2-substituted phenoxazines of use therein.

The novel 10-(dialkylaminoalkyl)-phenoxazine compounds of this invention have utility as pharmacodynamic agents, particularly as sedatives of value in mild cases of mental and emotional upset and as antiemetics. The pace of modern living has created a new problem for the medical world in the growing section of the population which lives under pressure from various sources such as from the uncertainty of work, unsettled home life or worry over illness. Drugs which have sedative action with a few side effects are particularly valuable since, in contrast to the more potent tranquilizing drugs, they may be administered in mild cases of mental and emotional upset with little danger of serious side effects.

More specifically, the novel 10-(dialkylaminoalkyl)-phenoxazine compounds of this invention are represented by the following structure:

FORMULA I

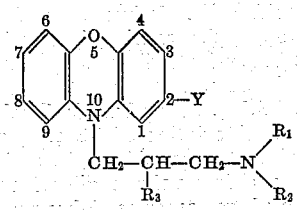

when:

Y represents chlorine, bromine and trifluoromethyl;
$R_1$ and $R_2$ represents methyl or ethyl; and
$R_3$ represents hydrogen or methyl.

This invention also includes salts of the above defined bases formed with pharmaceutically acceptable non-toxic organic and inorganic acids. Such salts are easily prepared by methods known to the art. The base is reacted with either the calculated amount of organic or inorganic acid in a water-miscible solvent, such as acetone or ethanol, with isolation of the salt by concentration and cooling; or with an excess of the acid in a water-immiscible solvent, such as ethyl acetate, ethyl ether or chloroform, with the desired salt separating directly. Exemplary of such organic salts are those with maleic, fumaric, benzoic, ascorbic, pamoic, succinic, bismethylenesalicylic, methylsulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-chlorotheophylline and 8-bromotheophylline. Exemplary of such inorganic salts are those with hydrochloric, hydrobromic, sulfuric, sulfamic, phosphoric and nitric acids. Of course, these salts may also be prepared by the classical method of double decomposition of appropriate salts which is well known to the art.

The novel 10-(dialkylaminoalkyl)-phenoxazine compounds of this invention are more advantageous as sedative agents than the somewhat related prior art 10-alkylated phenoxazines unsubstituted in the 2-position. Further, in contrast to the potent tranquilizing drugs of the phenothiazine class, these compounds produce effective sedation with a minimum of tranquilization. Of particular advantage in this regard are compounds of Formula I in which Y is chlorine and trifluoromethyl; exemplary of a particularly useful compound is 2-chloro-10-(3'-dimethylaminopropyl)-phenoxazine.

The new compounds of this invention are prepared by the following synthetic route:

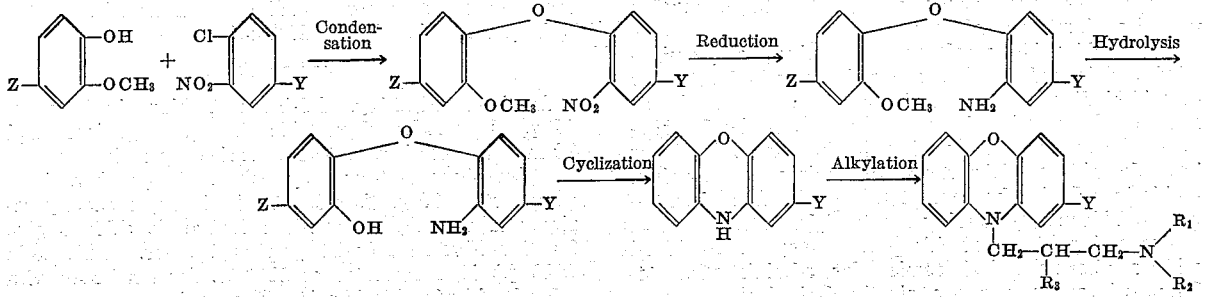

when one of Z or Y is chlorine, bromine or trifluoromethyl, and the other is hydrogen.

The compounds of this invention are prepared by condensing 2-nitrochlorobenzene and guaiacol(1-hydroxy-2-methoxybenzene) with the desired substituent in the 2 position in the end products, i.e., chlorine, bromine or trifluoromethyl, being present either in the 4 position of the nitrohalobenzene or in the 4 position of the guaiacol to form the correspondingly substituted 2'-methoxy-2-nitrodiphenyl ether. The reactants are heated, preferably at reflux, in the presence of water and a condensing agent, for example, an alkali metal hydroxide such as sodium hydroxide or potassium hydroxide. The thus formed substituted - 2'-methoxy-2-nitrodiphenyl ether is reduced preferably employing Raney nickel-hydrazine hydrate in ethanol or by catalytic hydrogenation, for instance with platinum oxide catalyst.

The resulting corresponding substituted-2'-methoxy-2-aminodiphenyl ether is then hydrolyzed to a substituted 2-amino-2'-hydroxydiphenyl ether preferably by heating in the presence of 48% hydrobromic acid or by heating with hydrochloric acid in a closed system such as a sealed tube, the temperature of the reaction in both cases being maintained in the range of from about 120° C. to about 140° C. The substituted 2-amino-2'-hydroxydiphenyl ether is then cyclized to the desired 2-substituted phenoxazine by heating the amino compound with a mineral acid, for example, sulfuric, or a hydrohalic acid such as hydrobromic or hydrochloric acid, preferably in a closed system such as in a Carius tube, at from about 180° C. to 220° C. until the cyclization is complete, normally from 4 to 72 hours.

Following this procedure, 2-substituted-phenoxazines having the following formula are formed:

FORMULA II

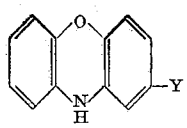

Y representing chlorine, bromine or trifluoromethyl.

These 2-substituted-phenoxazines have utility as intermediates in the preparation of the 10-(dialkylaminopropyl)-phenoxazines of this invention.

The yields in each step in the procedure set forth above are good and the reactions are clean-cut with a minimum of by-products formed.

To form the compounds of Formula I, the 2-substituted phenoxazines of Formula II, with Y being chlorine, bromine or trifluoromethyl, as desired, are alkylated with a reactive dialkylaminoalkyl ester such as a halide, preferably chloride or bromide, or an arylsulfonate such as p-tosylate or phenylsulfonate in a suitable inert aromatic solvent such as benzene, xylene or toluene, in which at least one of the reactants must be soluble. A suitable acid-binding agent may be included such as an alkali metal amide, preferably sodium amide or potassium amide; an alkali metal hydride, for example, sodium or potassium hydride, and preferably sodium hydride; an alkali metal hydroxide, for example sodium or potassium hydroxide and preferably potassium hydroxide or an alkali metal aryl or alkyl compound, preferably phenyl sodium or octyl sodium.

If an acid adidtion salt of the reactive dialkylaminoalkyl ester is used, a corresponding increase in the amount of acid-binding agent must also be used. The preferred method of alkylation, however, is to react the 2-substituted phenoxazine with a dialkylaminoalkyl chloride or bromide with a slight excess of sodium or potassium amide in refluxing benzene or toluene for from 30 minutes to 24 hours, preferably two to eight hours.

The end products of this process may be combined with a pharmaceutical carrier for administration to humans in an amount to attain the desired pharmacodynamic effect, for instance a sedative effect. Such carriers are either solid or liquid. Exemplary of solid pharmaceutical carriers are lactose, cornstarch, mannitol, talc, etc. The compounds of this invention are mixed with the carrier and filled into hard gelatin capsules or tableted with suitable tableting aids such as magnesium stearate, starch, or other lubricants, disintegrants or coloring agents. If combination with a liquid carrier is desirable, a soft gelatin capsule is filled with a slurry of the novel compounds in soy bean or peanut oil. Aqueous suspensions or solutions are prepared for alternate oral or parenteral administration.

The following examples are drawn to illustrate novel compounds of this invention and will serve to illustrate the process for the preparation of the compounds as well as the utility of certain new intermediate compounds.

*Example I*

A mixture of 200 g. of 2,5-dichloronitrobenzene, 160 g. of guaiacol, 65 g. of potassium hydroxide and 20 ml. of water is heated at reflux with stirring for three hours. After cooling, the reaction mixture is shaken with a mixture of benzene and dilute sodium hydroxide. The benzene extracts are combined, washed with a dilute alkali solution and water. After evaporation of the solvent and distillation of the excess nitro compound, the crude 4-chloro-2'-methoxy-2-nitrodiphenyl ether (95%) is obtained.

A solution of 222 g. of 4-chloro-2'-methoxy-2-nitrodiphenyl ether in 1200 ml. of ethanol is treated with 20 g. of Raney nickel and 165 ml. of hydrazine hydrate with stirring. The reaction mixture is heated on the steam bath for one hour, then filtered through a filter aid. The solvent is evaporated in vacuo and 800 ml. of 48% hydrobromic acid added. The acid mixture is then heated for two hours as the vapor temperature climbs to 120–125° C. The acid solution is diluted with water. The precipitate is dissolved in sodium hydroxide solution, washed with ether and recovered by acidification with acetic acid. After filtration, washing with water and drying, white needles (M.P. 138–139° C., 66%) of 2-amino-4-chloro-2'-hydroxydiphenyl ether are obtained.

A mixture of 25g. of the amino compound and 3.8 ml. of hydrochloric acid in a Carius tube is heated at 195° C. for 15 hours. The black solid is dissolved in acetone, neutralized with sodium bicarbonate and evaporated in vacuo. The residue is then distilled by short passage distillation to give a solid distillate which is taken into benzene. Unchanged starting material is recovered by extracting the benzene solution with dilute sodium hydroxide solution. The benzene layer is dried, concentrated and diluted with hexane to give white flakes (M.P. 144–145° C., 58%) of 2-chlorophenoxazine.

A suspension of 21.8 g. of 2-chlorophenoxazine, 8.5 g. of 3-chloro-1-dimethylaminopropane and 2.5 g. of sodium amide in 150 ml. of dry benzene is heated at reflux for 20 hours. The reaction mixture is diluted with water, neutralized and the benzene layers separated. After vacuum distillation, 2-chloro-10-(3'-dimethylaminopropyl)-phenoxazine (B.P. 178 to 180° at 0.3 mm.; 85%) is obtained.

The hydrochloride is prepared by dissolving 2 g. of base in ethyl acetate and adding an excess of alcoholic hydrogen chloride; M.P. 223–224° C.

*Example II*

A mixture of 230 g. of 5-bromo-2-chloronitrobenzene, 65 g. of potassium hydroxide, 150 g. of guaiacol and 30 ml. of water is reacted and worked up as in Example I to give 4-bromo-2'-methoxy-2-nitrodiphenyl ether. This compound (100 g.) is reduced with Raney nickel-hydrazine and demethylated with hydrobromic acid to give 2-amino-4-bromo-2'-hydroxydiphenyl ether. This solid (120 g.) is then heated at 225° C. for ten hours with 4.0 ml. of hydrochloric acid. The cyclization gives crystals of 2-bromophenoxazine.

A suspension of 13.2 g. of 2-bromophenoxazine and 8.0 g. of potassium amide in 150 ml. of toluene is heated at reflux with stirring briefly. After the addition of 15.0 g. of 3-bromo-1-diethylaminopropane hydrobromide, the reflux period is continued for six hours. The reaction mixture is cooled, diluted carefully with water and neutralized. The organic layers are extracted with dilute hydrochloric acid. The desired base, 2-bromo-10-(3'-diethylaminopropyl)-phenoxazine, is then isolated by regenerating the base with sodium carbonate and molecularly distilling the base.

A solution of 3.7 g. of the base is dissolved in 50 ml. of ethyl acetate. A solution of 1.2 g. of maleic acid in 25 ml. of ethyl acetate is added. The filtered solution is evaporated to a low volume diluted somewhat with ether and cooled to separate 2-bromo-10-(3'-diethylaminopropyl)-phenoxazine maleate.

*Example III*

A mixture of 100 g. of 4-chloro-3-nitrotrifluoromethylbenzene, 140 g. of guaiacol, 60 g. of potassium hydroxide and 20 ml. of water are reacted and the product isolated as in Example I to give 2'-methoxy-2-nitro-4-trifluoromethyldiphenyl ether.

The crude diphenyl ether (125 g.) is then reduced with Raney nickel and hydrazine hydrate in ethanol with subsequent hydrolysis by 48% hydrobromic acid following the previously described procedure to give 2-amino-2'-hydroxy-4-trifluoromethyldiphenyl ether.

Sixty grams of this ether are heated with 8.0 ml. of concentrated hydrochloric acid in two Carius tubes at 200° C. for ten hours. The isolation procedure of Example I gives crystals of 2-trifluoromethylphenoxazine.

A suspension of 5.0 g. of 2-trifluoromethylphenoxazine, 1.0 g. of sodium amide and 3.0 g. of 3-chloro-1-dimethylaminopropane in 30 ml. of benzene is heated at reflux with stirring for eight hours. The cooled mixture is quenched with 20 ml. of water. The benzene layer is separated and extracted with hydrochloric acid. On addition of caustic to the aqueous layer, the base is recovered, and distilled with a microdistillation, short path apparatus to give 10-(3'-dimethylaminopropyl)-2-trifluoromethylphenoxazine.

*Example IV*

A suspension of 4.3 g. of the p-toluenesulphonic acid salt of 3-dimethylaminopropyl-1-p-toluenesulphonate, prepared by the reaction of p-toluenesulphonyl chloride with 1-dimethylamino-3-hydroxypropane in pyridine then forming the salt from the resulting free base, 2.3 g. of sodium amide and 5.0 g. of 2-trifluoromethylphenoxazine (prepared as in Example III) in 75 ml. of toluene is heated at reflux for three hours. The cooled reaction mixture is washed with water and extracted with several portions of dilute hydrochloric acid. The acid extracts are then worked up as before to yield the desired 10-(3'-dimethylaminopropyl)-2-trifluoromethylphenoxazine.

Part of this free base (750 mg.) is dissolved in ethanol. The solution is saturated with hydrogen chloride gas. Crystals of 10-(3'-dimethylaminopropyl)-2-trifluoromethylphenoxazine hydrochloride separate after gradual evaporation on the steam bath and trituration with ether.

*Example V*

A suspension of 12.7 g. of 2-chlorophenoxazine, 6.7 g. of 3-chloro-2-methyl-1-dimethylaminopropane and 1.3 g. of sodium amide in 100 ml. of dry benzene is heated at reflux for eight hours. The reaction mixture is diluted with water, neutralized and the organic layers separated. Vacuum distillation yields 2-chloro-10-[2'-methyl-3'-dimethylaminopropyl]-phenoxazine, as a high boiling viscous liquid which crystallizes upon standing.

This application is a continuation-in-part of application Serial Number 624,974, filed November 29, 1956, now abandoned.

It is not desired to be limited except as set forth in the following claims.

What is claimed is:

1. Chemical compounds of the class consisting of a free base and its nontoxic organic and inorganic acid addition salts, the free base having the formula:

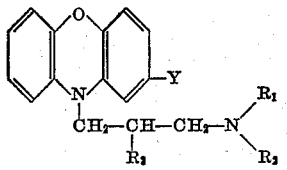

in which Y is a member selected from the group consisting of chlorine and bromine; $R_1$ and $R_2$ are members selected from the group consisting of methyl and ethyl; and $R_3$ is a member selected from the group consisting of hydrogen and methyl.

2. 2-substituted phenoxazines having the formula:

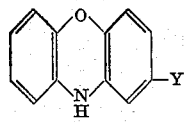

in which Y is a member selected from the group consisting of chlorine and bromine.

3. The method of forming 2-substituted phenoxazines having the following formula:

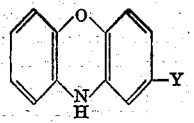

in which Y is a member selected from the group consisting of chlorine and bromine; which comprises: hydrolyzing a substituted 2-aminodiphenyl ether having the following formula:

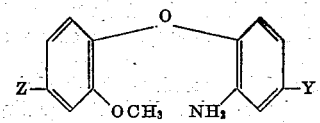

in which Y and Z are members selected from the group consisting of chlorine, bromine and hydrogen, one of Z and Y being hydrogen, to form the corresponding substituted-2-amino-2'-hydroxydiphenyl ether; and cyclizing the thus formed amino compound to form the 2-substituted phenoxazine by heating the amino compound with a mineral acid.

4. The method in accordance with claim 3 characterized in that the cyclizing is carried out in a closed system in a temperature range of from about 180° C. to about 220° C.

5. The method in accordance with claim 3 characterized in that the hydrolysis is carried out by heating in the presence of hydrobromic acid and the cyclizing is carried out in a closed system in a temperature range of from about 180° C. to about 220° C.

6. The method in accordance with claim 3 characterized in that the hydrolysis is carried out by heating with hydrochloric acid in a closed system and the cyclizing is carried out in a closed system in a temperature range of from about 180° C. to about 220° C.

7. The method of forming a 10-(dialkylaminoalkyl)-phenoxazine compound of the following formula:

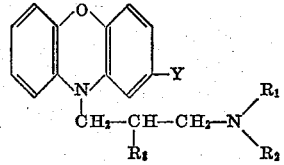

in which Y is a member selected from the group consisting of chlorine and bromine; $R_1$ and $R_2$ are members selected from the group consisting of methyl and ethyl; and $R_3$ is a member selected from the group consisting of hydrogen and methyl; which comprises: hydrolyzing a substituted 2-aminodiphenyl ether having the following formula:

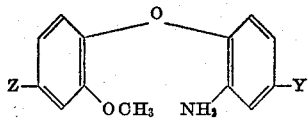

in which Y and Z are members selected from the group consisting of chlorine, bromine and hydrogen, one of Z and Y being hydrogen, to form the corresponding substituted-2-amino-2'-hydroxydiphenyl ether; cyclizing the thus formed amino compound to form a 2-substituted phenoxazine by heating the amino compound with a mineral acid and alkylating the thus formed 2-substituted phenoxazines with a reactive dialkylaminoalkyl ester.

8. The method in accordance with claim 7 characterized in that the cyclizing is carried out in a closed system in a temperature range of from about 180° C. to about 220° C.

9. The method in accordance with claim 7 characterized in that the hydrolysis is carried out by heating in the presence of hydrobromic acid and the cyclizing is carried out in a closed system in a temperature range of from about 180° C. to about 220° C.

10. The method in accordance with claim 7 characterized in that the hydrolysis is carried out by heating with hydrochloric acid in a closed system and the cyclizing is carried out in a closed system in a temperature range of from about 180° C. to about 220° C.

11. The method in accordance with claim 7 characterized in that the cyclizing is carried out in a closed system in a temperature range of from about 180° C. to about 220° C., the hydrolysis is carried out by heating with a mineral acid in a closed system and the alkylation is carried out in the presence of an acid binding agent.

12. The method in accordance with claim 11 characterized in that the reactive dialkylaminoalkyl ester is a halide.

13. 2-chloro-10-(3'-dimethylaminopropyl) - phenoxazine.

14. 2-chlorophenoxazine.

References Cited in the file of this patent

UNITED STATES PATENTS

| 2,464,885 | Olpin | Mar. 22, 1949 |
| 2,485,212 | Miescher et al. | Oct. 18, 1949 |
| 2,645,640 | Charpentier | July 14, 1953 |
| 2,676,971 | Cusic et al. | Apr. 27, 1954 |

FOREIGN PATENTS

| 201,628 | Australia | Oct. 20, 1955 |
| 103,301 | Germany | Mar. 12, 1897 |

OTHER REFERENCES

Massie: Chem. Reviews, vol. 54, p. 823 (1954).